(12) United States Patent
Stephan et al.

(10) Patent No.: US 11,509,045 B2
(45) Date of Patent: Nov. 22, 2022

(54) VEHICLE BODY PART COMPRISING AT LEAST ONE DIRECTIONAL ANTENNA

(71) Applicants: COMPAGNIE PLASTIC OMNIUM, Lyons (FR); Centre National de la Recherche Scientifique, Paris (FR); Greenerwave SAS, Valbonne Sophia Antipolis (FR); Ecole Supérieure de Physique et de Chimie Industrielles de la Ville de Paris, Paris (FR)

(72) Inventors: Ronan Stephan, Levallois-Perret (FR); Mathieu Bancelin, Levallois-Perret (FR); Mathias Fink, Meudon (FR); Geoffroy Lerosey, Paris (FR); Nicolas Etaix, Villejuif (FR)

(73) Assignees: ECOLE SUPÉRIEURE DE PHYSIQUE ET DE CHIMIE INDUSTRIELLES DE LA VILLE DE PARIS, Paris (FR); CENTRE NATIONAL DE LA RECHERCHE SCIENTIFIQUE, Paris (FR); COMPAGNIE PLASTIC OMNIUM, Lyons (FR); GREENERWAVE SAS, Valbonne Sophia Antipolis (FR)

( * ) Notice: Subject to any disclaimer, the term of this patent is extended or adjusted under 35 U.S.C. 154(b) by 0 days.

(21) Appl. No.: 17/271,501

(22) PCT Filed: Aug. 23, 2019

(86) PCT No.: PCT/EP2019/072639
§ 371 (c)(1),
(2) Date: Feb. 25, 2021

(87) PCT Pub. No.: WO2020/043633
PCT Pub. Date: Mar. 5, 2020

(65) Prior Publication Data
US 2021/0203065 A1    Jul. 1, 2021

(30) Foreign Application Priority Data

Aug. 27, 2018 (FR) .................................. 1857669
Mar. 22, 2019 (FR) .................................. 1903027

(51) Int. Cl.
*H04B 1/3822* (2015.01)
*H01Q 1/32* (2006.01)
*H01Q 15/14* (2006.01)

(52) U.S. Cl.
CPC ......... *H01Q 1/3283* (2013.01); *H01Q 15/148* (2013.01); *H04B 1/3822* (2013.01)

(58) Field of Classification Search
CPC .... H01Q 13/10; H01Q 1/3283; H01Q 15/148; H01Q 1/32; H01Q 1/325; H01Q 15/14; H04B 1/38; H04B 1/3822
See application file for complete search history.

(56) References Cited

U.S. PATENT DOCUMENTS

2004/0263408 A1    12/2004  Sievenpiper et al.
2010/0238085 A1*   9/2010   Fuh ........................ H01Q 13/22
                                                              343/771

(Continued)

FOREIGN PATENT DOCUMENTS

FR    3054940 B1    8/2019
FR    3085234 A1    2/2020

OTHER PUBLICATIONS

International Search Report of International Searching Authority for PCT/EP2019/072639 ISA/EPO, dated Mar. 5, 2020.
(Continued)

*Primary Examiner* — Blane J Jackson
(74) *Attorney, Agent, or Firm* — M&B IP Analysts, LLC

(57) ABSTRACT

A body part for a motorized land vehicle is provided. The body part includes at least one wall made of a plastic material and including at least one housing forming a cavity
(Continued)

for electromagnetic waves, said housing includes: at least one transceiver for transmitting and/or receiving an electromagnetic wave in said housing; at least one adaptable surface capable of reflecting the electromagnetic wave transmitted by the transceiver in a given direction (in a controlled manner) and, conversely, capable of reflecting the electromagnetic wave coming from the exterior of the housing toward the transceiver.

21 Claims, 2 Drawing Sheets

(56) References Cited

U.S. PATENT DOCUMENTS

| | | |
|---|---|---|
| 2012/0200465 A1 | 8/2012 | Kühne et al. |
| 2013/0201068 A1 | 8/2013 | Alexopoulos et al. |
| 2015/0130673 A1 | 5/2015 | Ng et al. |
| 2016/0233971 A1 | 8/2016 | Fink et al. |
| 2017/0133762 A1 | 5/2017 | Ng et al. |
| 2017/0187121 A1* | 6/2017 | Kirino ............... H01Q 21/005 |
| 2018/0026356 A1* | 1/2018 | Schmalenberg ..... H01Q 1/3283 343/713 |
| 2018/0231657 A1* | 8/2018 | Woehlte ............... G01S 13/931 |

OTHER PUBLICATIONS

Written Opinion of International Searching Authority for PCT/EP2019/072639, ISA/EPO), dated Mar. 5, 2020.

* cited by examiner

[Fig. 1]
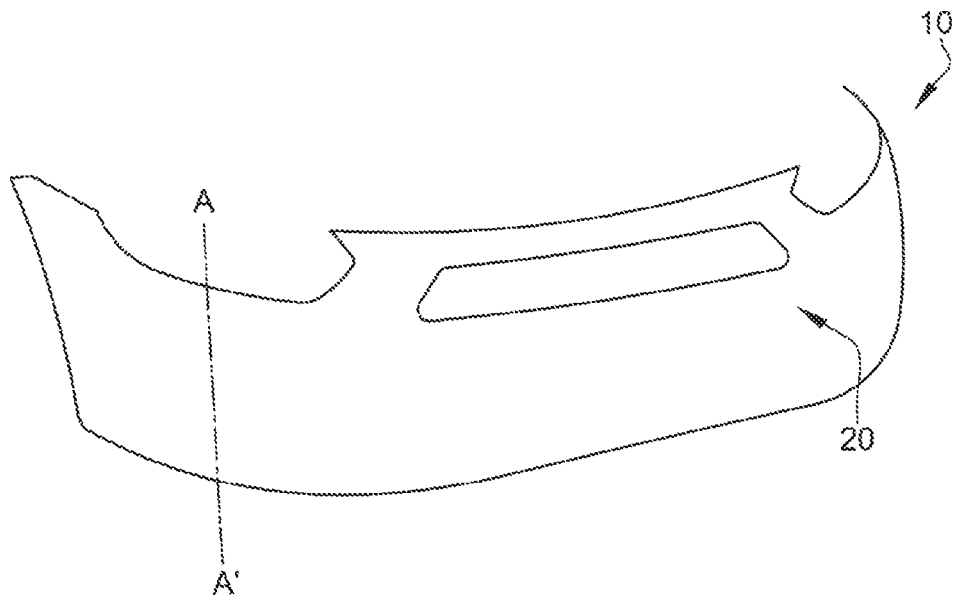
[Fig. 2]
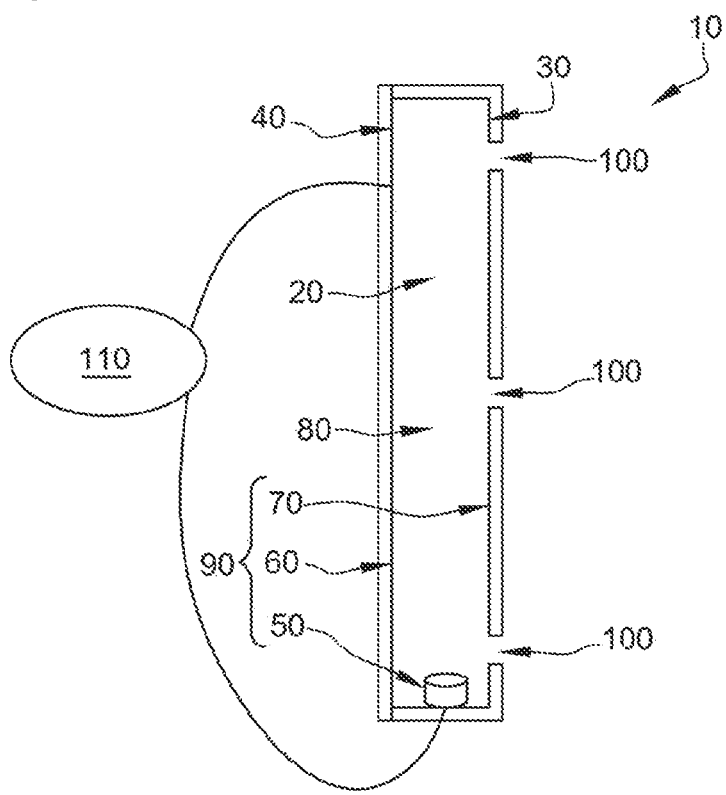

[Fig. 3]
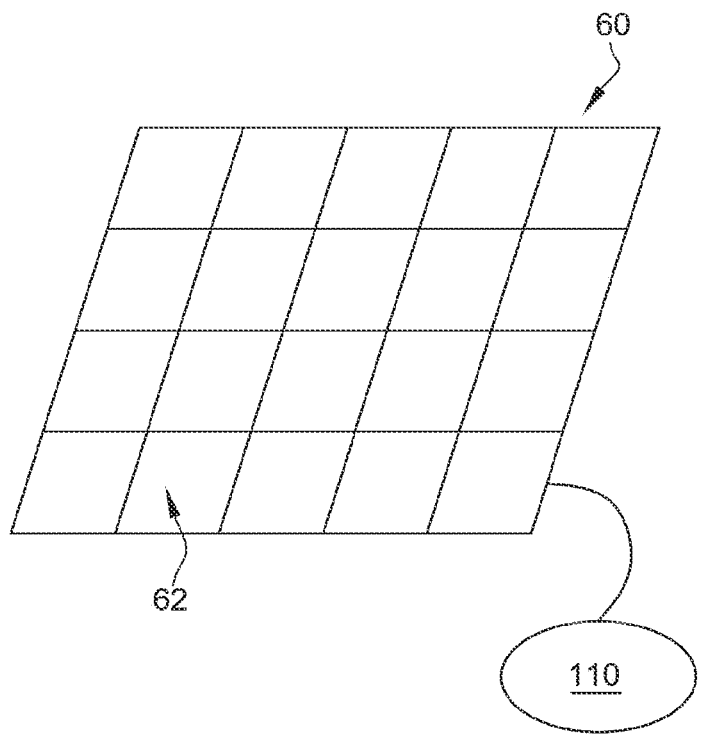
[Fig. 4]
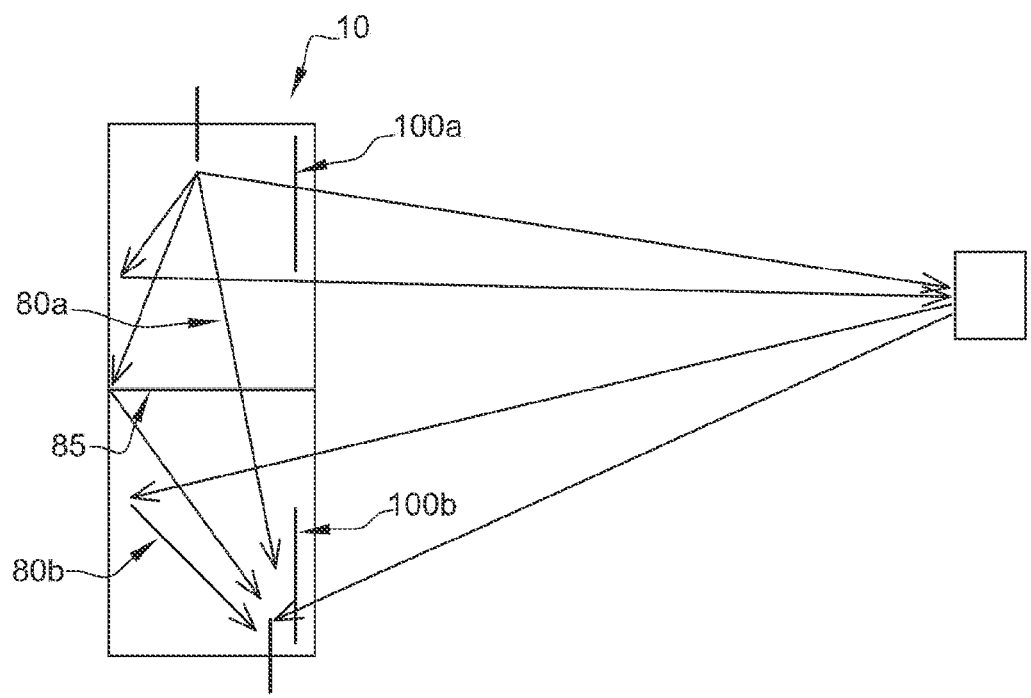

VEHICLE BODY PART COMPRISING AT LEAST ONE DIRECTIONAL ANTENNA

CROSS-REFERENCE TO RELATED APPLICATIONS

This application claims priority under 35 U.S.C. § 371 to the International Application No PCT/EP2019/072639, filed Aug. 23, 2019, and to the French Patent Application FR1857669 filed Aug. 27, 2018, and the French Patent Application FR1903027 filed Mar. 22, 2019, the contents of which are hereby incorporated by reference.

The present disclosure relates to the field of motorized land vehicles, for example motor vehicles, equipped with a directional antenna for transmitting and/or receiving an electromagnetic wave in a desired direction. An antenna is isotropic if it transmits and/or receives an electromagnetic wave in the same way in all directions. An antenna has directivity if it transmits and/or receives an electromagnetic wave in a specific direction.

Vehicles are known which are equipped with such antennas in order to communicate with remote systems, to send or receive information. These antennas are usually positioned on the roof of the vehicle, but also partially on other body parts such as the tailgate and hood.

Vehicles are also known which are equipped with devices of the radar type, generally positioned on the front and rear bumpers of the vehicle. In fact, for safety reasons in particular, it is known practice to equip motor vehicles with radars, for example of the ACC type, according to the expression "Adaptive Cruise Control." Such a radar is used in particular to regulate the speed of the vehicles as a function of the traffic and/or of obstacles on the road. The radar detects the speed and the distance of the object in front of the carrier vehicle, so as in particular to maintain a safety distance between the vehicles.

In general, an important field of radar applications in the automotive industry is that of vehicle bodywork, in which a growing number of radar modules are being integrated so as to allow total peripheral vision around the vehicle, for example for equipment such as assistance systems for parking maneuvers, backup assistance systems or pedestrian protection facilities, or other such systems.

In order to better characterize the peripheral environment of the vehicle, automobile manufacturers are looking for devices making it possible to improve, on the one hand, the size of the study volume around the vehicle, scanned by electromagnetic waves, and on the other hand, the resolution of the information processing from these systems. This is so that the vehicle interacts optimally with its environment, in particular to avoid accidents, facilitate maneuvering and drive independently.

Thus, vehicles are increasingly equipped with devices such as LIDARs and cameras.

To obtain information in addition to the information relative to the position and the distance of an obstacle, devices with increased spatial resolution are sought. Spatial resolution, also called resolving power, or separating power, expresses the ability of a measuring or observing device to distinguish details. It can be characterized by the minimum distance which must separate two contiguous points for them to be correctly discerned.

This resolution distance is a function of the ratio between the wavelength of the wave used for the observation, and the size of the aperture of the observation device. Thus, to increase the spatial resolution, i.e., to decrease the resolution distance, it is necessary to decrease the wavelength (increase the frequency of the wave) and/or necessary to increase the aperture of the observation device.

This is why it is advantageous today to increase the frequency of radars, and to multiply the number of radars distributed over a given surface. Since the space available on a vehicle is limited, it is therefore also sought to miniaturize the radars.

However, the increase in the number of radars distributed over a given surface generates an increase in cost.

In addition, the increase in the number of radars necessitates supplying numerous radiofrequency tracks, which is complex, expensive, and consumes considerable energy.

In addition, although the radars are smaller and smaller, the increase in the number of radars distributed over a given surface generally generates an increase in the size of the surface, especially since it is necessary to maintain a minimum distance between each radar.

Moreover, one problem encountered for a radar carried by a body part concerns the positioning of the radar. Indeed, it is important to be able to ensure the integrity of a radar, so that it fulfills its function correctly, even in the event of deformation of the body part carrying it (impact, thermal expansion, etc.). It is therefore necessary to ensure good positioning of the radar (transmission/reception direction maintained) throughout the duration of use of the radar function.

The object of the disclosed embodiments is to remedy the aforementioned drawbacks, by providing a body part of a motorized land vehicle comprising at least one directional antenna, capable of transmitting and/or receiving an electromagnetic wave in a given direction from a large surface (in relation to the size of the body part itself).

To this end, the disclosed embodiments relate to a body part of a motorized land vehicle comprising at least one wall made of plastic material, and comprising at least one housing forming a cavity for electromagnetic waves, said housing comprising:

at least one transceiver for transmitting and/or receiving an electromagnetic wave in said housing;

at least one adaptable surface capable of reflecting the electromagnetic wave transmitted by the transceiver in a given direction (in a controlled manner) and, conversely, capable of reflecting the electromagnetic wave coming from the exterior of the housing toward the transceiver.

Such a system makes it possible to obtain a high-resolution radar, making it possible to produce high-resolution images in 4D. An imaging radar is therefore obtained which is capable of reproducing an environment on its own according to the coordinates (x, y, z) in one piece, and of measuring the speed, as opposed to a single current radar which only measures a distance (according to the x coordinate for example) and the speed.

In addition, it is thus possible to control an adaptable surface (called a meta-surface) with conventional electronics (electrical signals) which will "shape" the wave transmitted by the transceiver and transform it into an imaging radar.

This system also has a very limited size, due to a reduced thickness between the walls of the body part, and reduced energy consumption. Indeed, the system works only on the reflections, by transmitting from a transceiver to large surfaces, and there is no need to supply the radiofrequency tracks. It is only necessary to channel electronic control to modify the adaptable surfaces.

The waves are transmitted in a certain volume, which is therefore much easier than supplying a large antenna. There is no loss of energy and little attenuation, so it is possible to go to a large radar surface and to cover a large surface at a low cost. In addition, this surface is as close as possible to the exterior of the vehicle, since it is the body part itself, with a minimum of material for the waves to pass through.

The body part may also comprise one or more of the following features, taken alone or in combination:
- the cavity comprises at least one aperture, the electromagnetic wave being transmitted to the exterior of the electromagnetic cavity or being received from the exterior of the electromagnetic cavity, through said aperture;
- the cavity is filled with air, with a plastic material different from the plastic material forming the rest of the wall, or with a plastic material identical to the plastic material forming the rest of the wall;
- the adaptable surface comprises a plurality of adjustable elements in order to modify an impedance of said adaptable surface and to modify the way in which the electromagnetic wave is reflected and/or transmitted by said adaptable surface;
- the adjustable elements of the adaptable surface comprise electronic components such as transistors, diodes, varicap diodes and/or piezoelectric components;
- the adaptable surface is connected to a controller which is able to control the adjustable elements of the adaptable surface;
- the controller is able to reconfigure the adjustable elements following a deformation of the body part;
- the controller is able to control the adjustable elements so that the wave transmitted by the transceiver sweeps a three-dimensional space located in front of the exterior face;
- the transceiver is able to transmit and/or receive electromagnetic waves at different frequencies, in particular 77 GHz;
- the housing comprises at least one reflecting element capable of reflecting an electromagnetic wave inside the cavity;
- the reflecting element and the adaptable surface delimit the electromagnetic cavity;
- the reflecting element is suitable for reflecting the wave transmitted by the transceiver over substantially the entire surface of the adaptable surface;
- the reflecting element is a first film fixed to at least part of the exterior face of the part;
- the first film is a metallic film;
- the adaptable surface constitutes a second film fixed to at least a part of the interior face of the part;
- the wall forms an electromagnetic cavity for the electromagnetic waves in which the transceiver and the adaptable surface are integrated, and the film comprises at least one aperture, the electromagnetic wave being transmitted outside the cavity or being received from outside the cavity, through said aperture;
- the size of the aperture is adjustable;
- the wall has a minimum length of 80 cm, a minimum width of 30 cm, and a thickness of less than 5 mm, preferably between 2 mm and 4 mm;
- the body part constitutes a bumper.

The subject of the disclosed embodiments is also a motorized land vehicle comprising a body part according to the disclosed embodiments.

The controller is advantageously able to control the adjustable elements so that the wave emitted by the transceiver sweeps a three-dimensional space on the periphery of the motorized land vehicle.

BRIEF DESCRIPTION OF THE FIGURES

The disclosed embodiments will be better understood on reading the description which follows, given solely by way of example and with reference to the appended drawings in which:

FIG. 1 is an illustration of an example of a body part according to the disclosed embodiments, a front bumper;

FIG. 2 is a cross-section A-A' of the bumper of FIG. 1;

FIG. 3 is an illustration of the adaptable surface of FIG. 2;

FIG. 4 is another example of a body part, according to which the body part comprises two electromagnetic cavities.

DETAILED DESCRIPTION

Reference is now made to FIG. 1, which illustrates an example of a body part 10 of a motorized land vehicle 200. According to this example, the body part 10 is a front bumper. But the embodiment relates to any body part, such as a rear bumper, a tailgate, a car door, a roof, a vehicle hood, a door or even a rocker panel. Advantageously, the embodiments relate to a large body part. A large dimension is understood to mean a part having an area greater than approximately 300 cm$^2$.

The body part 10 comprises at least one wall 20 provided with an exterior face 30 intended to be turned toward the exterior of the vehicle 200 and an interior face 40 opposite the exterior face.

As illustrated in more detail in FIG. 2, which shows a cross-section A-A' of the body part of FIG. 1, and thus shows a cross-section of the bumper, the wall 20 comprises at least one housing 90 forming a cavity 80 for electromagnetic waves, the housing 90 comprising:
- at least one transceiver 50 for transmitting and/or receiving an electromagnetic wave in said housing 90;
- at least one adaptable surface 60 which is capable of reflecting the electromagnetic wave transmitted by the transceiver 50 in a controlled manner, that is to say, in a given direction and, conversely, capable of reflecting the electromagnetic wave coming from the exterior of the housing 90 to the transceiver 50.

The electromagnetic cavity 80 comprises at least one aperture 100, the electromagnetic wave being transmitted to, or received from, the exterior of the electromagnetic cavity 80 through said aperture 100. Thus, the aperture 100 is an aperture in the electromagnetic sense which at least partially allows electromagnetic waves to leak outward from the wall 20. According to one embodiment, the size of the aperture 100 is adjustable, for example by electronically changing the transmittance of a portion of the aperture 100.

Owing to these arrangements, the electromagnetic wave generated by the transceiver 50 is reflected inside the electromagnetic cavity 80 and by the adaptable surface 60 several times before being transmitted via the aperture 100 (direct or semi-reflective aperture) toward the outside of the wall 20. This electromagnetic wave is then more easily controlled before its transmission. In particular, it is possible to create, simultaneously and with any type of transceiver, a directional antenna with a main lobe of large amplitude and an antenna with an orientable lobe (in elevation and in azimuth) in any direction. In addition, losses of electromagnetic radiation outside the adaptable surface 60 are avoided. The wave transmitted by the transceiver 50 is almost completely reflected by the adaptable surface 60, and therefore almost all of the energy can be controlled so as to be concentrated into a single beam, i.e. a main lobe. The antenna is therefore more efficient. In addition, all the paths between the transceiver 50 and the adaptable surface 60 are contained in the volume of the electromagnetic cavity 80, i.e. inside the wall 20, and the performance of the antenna will be better, thus enhancing the efficiency of the antenna.

According to one embodiment, the part 10 further comprises a screen 55 positioned in the electromagnetic cavity 80 between the transceiver 50 and the aperture 100 in order to limit direct electromagnetic wave radiation from the transceiver 50 toward the exterior of the wall 20 and/or to reflect the waves toward the adaptable surface 60.

Such a housing 90 forms a radar detection system suitable for imaging objects in a space located at the periphery of the vehicle 200. The body part 10 can thus comprise several antennas.

Such a housing 90 can also form a radio communication system suitable for communicating all types of data, such as audio and/or video data, or messages.

Through this integration of a transceiver 50 and an adaptable surface 60 into an electromagnetic cavity, the antenna is able to transform any electromagnetic radiation from the transceiver simultaneously into radiation whose orientation can be controlled at a solid angle in all spatial directions. In addition, this antenna is compact in thickness and very efficient.

According to another embodiment, illustrated in FIG. 4, the wall 20 comprises two cavities 80*a* and 80*b*: one cavity 80*a* is dedicated to the transmission of the electromagnetic wave, and another cavity 80*b* is dedicated to the reception of a electromagnetic wave. To do this, the electromagnetic cavity 80 is separated by a reflecting wall 85 which is capable of reflecting the electromagnetic waves. Such a reflecting wall 85 may for example be overmolded in the wall 20. Each cavity 80*a*, 80*b* then comprises at least one aperture 100*a*, 100*b*.

The Wall 20

The wall 20 constitutes the main body of the bumper 10. The wall 20 comprises at least one housing 90 forming a cavity 80 for electromagnetic waves.

The housing 90 can be all or part of the wall 20.

The cavity 80 can be filled with air, with a plastic material different from the plastic material forming the rest of the wall 20, or alternatively, be filled with the same plastic material as that of the wall 20 (in this case the housing 90 constitutes a volume included in the wall 20).

When the cavity 80 is filled with a material, this material is transparent or semi-transparent to electromagnetic waves. The cavity 80 can thus be made of a plastic material which can be chosen, for example, from the following plastic materials: PP, PP-EPDM, ASA, ABS-PC, PC-PET, PMMA-ASA, and PC. Preferably, the material is selected from long chain polymers so as to minimize energy dissipation.

The housing 90 advantageously has a thickness greater than half the wavelength of the electromagnetic wave.

According to one embodiment, the housing 90 has a minimum length of 80 cm, a minimum width of 30 cm, and a thickness of less than 5 mm, preferably between 2 mm and 4 mm.

The housing 90 allows the transceiver 50 to make optimal use of the adaptable surface 60, that is to say, it aims to ensure that all the energy of the electromagnetic wave transmitted or entering the cavity 80 is reflected on the adaptable surface 60. The operating principle of such a radar as well as variant embodiments are described in the following document: FR1857669.

According to a particular embodiment, the housing 90 comprises a reflecting element 70, capable of reflecting electromagnetic waves inside the cavity 80.

Thus, an electromagnetic wave generated by the transceiver 50 or entering the housing 90 is reflected inside the cavity by the reflecting element and by the adaptable surface several times before being transmitted via the aperture (direct or semi-reflective aperture) to the exterior of the housing 90, or before being received by the transceiver 50. The energy of the emitted or transmitted wave is thus maximized.

Thus, the reflecting element 70 and the adaptable surface 60 define the electromagnetic cavity 80 for the electromagnetic waves transmitted/received by the transceiver 50.

According to an advantageous embodiment, the reflecting element 70 is suitable for reflecting the wave transmitted by the transceiver 50 over substantially the entire surface of the adaptable surface 60.

According to the embodiment, the reflecting element 70 is an electromagnetic waveguide.

According to another embodiment shown in FIG. 2, the reflecting element 70 is a first film fixed to at least part of the exterior face 30 of the part 10. This first film can advantageously be a metallic film. This film can be overmolded in the wall 20 or adhesive-coated on the wall 20.

This film can also be covered with a protective coating, for example made of PP, PP-EPDM, ASA, ABS-PC, PC-PET, PMMA-ASA, PC or PU.

The reflecting element 70 comprises at least one aperture 100 of the electromagnetic cavity 80.

The aperture may consist of several elementary apertures, these elementary apertures being on the exterior face 30 of the part.

The aperture can also consist at least partially of one or more semi-reflecting elements, such as:
- a thin metallic film (thinner than the film constituting the reflecting element 70);
- a network of holes in a metallic element;
- a network of metallic shapes, one hole or shape being distant from another neighboring one by a distance less than half the wavelength of the electromagnetic wave.

According to one embodiment, the semi-reflecting element comprises one or more adjustable aperture elements in order to modify the way in which the electromagnetic wave is reflected and/or transmitted by said aperture, a controller being connected to the adjustable aperture elements in order to control them from aperture parameters.

The Transceiver 50

The transceiver 50 makes it possible to transmit and/or receive an electromagnetic wave 300 in the thickness of the wall 20, mainly directly toward the adaptable surface 60, by orienting the transceiver 50 in the wall 20. This element 50 can be chosen from a list comprising a monopole, a dipole, a waveguide, a radiating waveguide, and a planar antenna.

The transceiver 50 is able to transmit and/or receive electromagnetic waves at different frequencies. For an application as a radar detection system suitable for locating objects in a space, the transceiver 50 is in particular suitable for transmitting and/or receiving electromagnetic waves at 77 GHz.

The transceiver 50 is connected, among other things, to a processor 110, as well as to a power element for powering it. Thus, the transceiver 50 can be matched in impedance with the impedance of the cavity 80, to meet a critical coupling condition.

The Adaptable Surface 60

The adaptable surface 60 is adapted to direct an electromagnetic wave out of the wall 20 in a given direction. The adaptable surface 60 may cover all or part of the cavity 80.

Known adaptable surface variants are for example described in document US 2004/263408 or in document US 2016/0233971. Many techniques are known for making such adaptable surfaces, sometimes called adaptable impedance surfaces, meta-surfaces, waveform shapers, reflection networks.

According to a particular embodiment, the adaptable surface 60 comprises a plurality of adjustable elements 62, which may or may not be distributed periodically, making it possible to modify the impedance of the adaptable surface 60 and to modify the way in which the electromagnetic wave is reflected and/or transmitted by the adaptable surface 60. These adjustable elements 62 may for example comprise electronic components such as transistors, diodes, varicap ("variable capacity") diodes, and/or piezoelectric components.

The adjustable elements 62 of the adaptable surface can be distributed in any way in the cavity because the multiple reflections ensure that the internal surface of the cavity 80 is swept and therefore that all the adjustable elements 62 are impacted. These elements 62 can be grouped into different sets. In each set, the elements 62 may be tuned to the same frequency, but from one group to another, the elements 62 are tuned to a plurality of different frequencies within a predetermined bandwidth.

The adaptable surface 60 is connected to a controller 110 which is capable of controlling the adjustable elements 62 from parameters, these parameters being determined from the desired direction of the electromagnetic wave, and possibly according to a desired polarization. These parameters are in particular the frequency, the power, the control voltages at the terminals of the elements of the adaptable surface, their spatial arrangement, their duration.

The controller 110 is advantageously linked to the transceiver in order to be synchronized and in order to adjust the parameters according to the imaging mode used.

These parameters can be pre-stored in a memory, or by calculation of a model or by an iterative method.

In particular, it is possible to record memory values in the controller of sets of parameters for a plurality of directions, for example a set of pairs of angular directions according to an angle of the horizontal plane (azimuth) and an angle of the vertical plane (elevation).

Thus, the controller 110 is able to control the adjustable elements 62 so that the wave emitted by the transceiver 50 sweeps a three-dimensional space located in front of the exterior face 30, or more generally, the transceiver 50 scans a three-dimensional space located on the periphery of the vehicle 200.

The controller 110 is also able to reconfigure the adjustable elements 62 following a deformation of the body part 10, such as a deformation due to a change in temperature, or following an impact experienced by the part.

According to a preferred embodiment, the adaptable surface 60 constitutes a second film, carrying electrical tracks and resonators, fixed to at least part of the interior face 40 of the part 10. This second film can be overmolded in the wall 20 or adhesive-coated on the wall 20.

According to another embodiment, the adaptable surface 60 comprises electrical tracks and resonators directly printed on at least part of the interior face 40 of the body part 10.

According to another embodiment, the electrical tracks and the resonators of the adaptable surface 60 are produced directly on at least part of the interior face 40 of the body part 10, by activating the plastic of the body part 10.

The embodiments also relate to a motorized land vehicle 200 comprising a body part 10 according to the disclosed embodiments.

The controller 110 is advantageously able to control the adjustable elements 62 so that the wave transmitted by the transceiver 50 sweeps a three-dimensional space on the periphery of the motorized land vehicle 200.

The disclosed embodiments are not limited to the embodiments described here, and other embodiments will become clearly apparent to a person skilled in the art. It would in particular be possible to consider a transceiver 50 which is linear, associated with a reflecting element 70 in the form of a cylinder portion.

LIST OF REFERENCES

10: body part
20: body part wall 10
30: exterior face of the wall 20, intended to be turned toward the exterior of the vehicle 100
40: interior face of wall 20, opposite the exterior face 30
50: transceiver
55: screen positioned in the electromagnetic cavity 80
60: adaptable surface
62: adjustable elements of the adaptable surface 60
70: reflecting element
80: electromagnetic cavity
80a and 80b: two electromagnetic cavities
85: reflecting wall separating the electromagnetic cavities 80a and 80b
90: assembly/antenna comprising at least one transceiver 50, at least one adaptable surface 60, at least one reflecting element 70
100: aperture of the electromagnetic cavity 80
100a: aperture of the electromagnetic cavity 80a
100b: aperture of the electromagnetic cavity 80b
110: adaptable surface controller 60
200: motorized land vehicle

The invention claimed is:

1. Body part of a motorized land vehicle, comprising: at least one wall made of plastic material, characterized in that it comprises at least one housing forming a cavity for electromagnetic waves, said at least one housing comprising:
   at least one transceiver for transmitting and/or receiving an electromagnetic wave in said housing;
   at least one adaptable surface capable of reflecting the electromagnetic wave transmitted by the transceiver in a given direction (in a controlled manner) and, conversely, capable of reflecting the electromagnetic wave coming from an exterior of the at least housing toward the transceiver,
   wherein the at least one adaptable surface comprises a plurality of adjustable elements in order to modify an impedance of said adaptable surface and to modify the way in which the electromagnetic wave is at least one of reflected by said adaptable surface and transmitted by said adaptable surface.

2. The body part according to claim 1, wherein the cavity comprises: at least one aperture, the electromagnetic wave being transmitted to the exterior of the electromagnetic cavity) or being received from the exterior of the electromagnetic cavity, through said aperture.

3. The body part according to claim 1, wherein the cavity is filled with air, with a plastic material different from the plastic material forming the rest of the wall, or with a plastic material identical to the plastic material forming the rest of the wall.

4. The body part according to claim 1, wherein the adjustable elements of the adaptable surface comprise electronic components, wherein the electronic components include at least one of: transistors, diodes, varicap diodes, and piezoelectric components.

5. The body part according to claim 1, wherein the adaptable surface is connected to a controller which is able to control the adjustable elements of the adaptable surface.

6. The body part according to claim 5, wherein the controller is configured to reconfigure the adjustable elements following a deformation of the body part.

7. The body part according to claim 6, wherein the controller is configured to control the adjustable elements so that the wave transmitted by the transceiver sweeps a three-dimensional space located in front of an exterior face.

8. The body part according to claim 5, wherein the transceiver is configured to transmit and receive electromagnetic waves at different frequencies, wherein the different frequencies include at least 77 GHz.

9. The body part according to claim 1, wherein the housing further comprises: at least one reflecting element configured to reflect an electromagnetic wave inside the cavity.

10. The body part according to claim 9, wherein the reflecting element and the adaptable surface delimit the electromagnetic cavity.

11. The body part according to claim 10, wherein the reflecting element is configured to reflect the wave transmitted by the transceiver over substantially the entire surface of the adaptable surface.

12. The body part according to claim 11, wherein the reflecting element is a first film fixed to at least part of the exterior face of the part.

13. The body part according to the claim 12, wherein the first film is a metallic film.

14. The body part according to claim 1, wherein the adaptable surface constitutes a second film fixed to at least a part of the interior face of the part.

15. The body part according to claim 1, wherein the wall forms an electromagnetic cavity for the electromagnetic waves in which the transceiver and the adaptable surface are integrated, and the film comprises at least one aperture, the electromagnetic wave being transmitted outside the cavity or being received from outside the cavity, through said aperture.

16. The body part according to claim 15, wherein the size of the at least one aperture is adjustable.

17. The body part according to claim 15, wherein the wall has a minimum length of 80 cm, a minimum width of 30 cm, and a thickness of less than 5 mm.

18. The body part of claim 1, wherein the body part further comprises: a bumper.

19. A motorized land vehicle comprising a body part according to claim 1.

20. The motorized land vehicle according to claim 19, further comprises: a controller, wherein the controller is configured to control adjustable elements so that the wave transmitted by the transceiver sweeps a three-dimensional space on a periphery of the motorized land vehicle.

21. The body part according to claim 17, wherein the wall has the thickness of between 2 mm and 4 mm.

* * * * *